Aug. 26, 1941.　　　A. E. BOWEN　　　2,253,503
GENERATION AND TRANSMISSION OF HIGH FREQUENCY OSCILLATIONS
Filed Aug. 6, 1938　　　5 Sheets-Sheet 1

INVENTOR
A. E. BOWEN
BY
N. O. Ewing
ATTORNEY

Aug. 26, 1941.   A. E. BOWEN   2,253,503
GENERATION AND TRANSMISSION OF HIGH FREQUENCY OSCILLATIONS
Filed Aug. 6, 1938    5 Sheets-Sheet 2

INVENTOR
A. E. BOWEN
BY  N. A. Ewing
ATTORNEY

Aug. 26, 1941.   A. E. BOWEN   2,253,503
GENERATION AND TRANSMISSION OF HIGH FREQUENCY OSCILLATIONS
Filed Aug. 6, 1938   5 Sheets-Sheet 3

INVENTOR
A. E. BOWEN
BY
N. A. Ewing
ATTORNEY Aug. 26, 1941.                A. E. BOWEN                2,253,503
       GENERATION AND TRANSMISSION OF HIGH FREQUENCY OSCILLATIONS
                    Filed Aug. 6, 1938          5 Sheets-Sheet 4

INVENTOR
A. E. BOWEN
BY
              *N. A. Ewing*
                      ATTORNEY Patented Aug. 26, 1941

2,253,503

UNITED STATES PATENT OFFICE 2,253,503

GENERATION AND TRANSMISSION OF HIGH FREQUENCY OSCILLATIONS

Arnold E. Bowen, Red Bank, N. J., assignor to Bell Telephone Laboratories, Incorporated, New York, N. Y., a corporation of New York Application August 6, 1938, Serial No. 223,426

15 Claims. (Cl. 178—44)

This invention relates to the art of transmission by ultra-high frequency electromagnetic waves and more particularly to the generation and modulation of such waves.

An object of the invention is to increase the efficiency with which oscillations of ultra-high frequency are generated.

Another object is to increase the harmonic power output and frequency stability of a high power oscillator.

The invention has for a more specific object an improvement in the efficiency, power output and other operating characteristics of an oscillation generator adapted for a system for the guided transmission of electromagnetic waves through a metallic pipe.

In accordance with important embodiments of the present invention, the foregoing objects are realized in an oscillation system utilizing the transmission cut-off characteristics of a metallic pipe guide, either alone or in conjunction with the phase velocity characteristics thereof, to select a desired harmonic or harmonics of an oscillation generator to the exclusion of a fundamental and undesired harmonics, and more particularly in a preferred embodiment of the invention by inhibiting the abstraction of power from the oscillator at the fundamental and undesired harmonic frequencies. A principal feature of these embodiments is that the fundamental frequency determining means serves also to enhance the harmonic power output. In accordance with another embodiment of the invention, harmonic power is derived from a magnetron oscillator.

The nature of the present invention and its various objects, features and advantages will appear more fully in the following description of several illustrative and specific embodiments, reference being made to the accompanying drawings in which:

Figs. 7 to 14E disclose wave type converters adapted for the system shown in Fig. 6;

In some respects the present invention may be considered as an improvement on the invention disclosed and claimed in an application for Letters Patent, Serial No. 223,424, filed of even date herewith by G. C. Southworth.

It has been shown heretofore that the interior of a metallic pipe can be used for the transmission of certain types of high frequency electromagnetic waves, sometimes called dielectrically guided waves, provided the frequency of the waves exceeds a certain critical or cut-off frequency that is dependent on the type of wave, the transverse dimensions of the pipe and the dielectric coefficient of the medium filling the interior of the pipe. These various types of dielectrically guided waves are distinguished by their respective characteristic spacial distribution of the component electric and magnetic fields, and they may be represented as $E_{01}$, $E_{11}$, $H_{01}$, $H_{11}$, etc. as indicated in the articles by G. C. Southworth and J. R. Carson et al. appearing in the April 1936 issue of the Bell System Technical Journal. Both of these articles disclose the critical relation that exists at cut-off between frequency, dielectric coefficient and diameter of guide for each of the four principal types of waves mentioned above as transmitted through a hollow pipe of circular cross-section.

Figure 1:
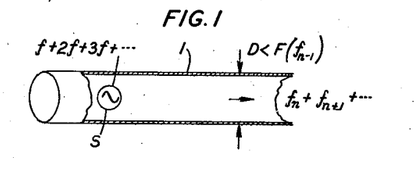
Figs. 1 and 2 are schematic drawings illustrating certain principles utilized in accordance with the invention.

Referring now to Fig. 1, there is shown schematically a system that illustrates certain principles involved in the present invention, and which comprises an oscillation generator S which is adapted to oscillate at a certain fundamental frequency $f$ and at harmonic frequencies $2f$, $3f$, $4f$, etc., disposed within and near the closed end of a cylindrical metallic pipe I containing a gaseous dielectric medium. The internal diameter D of the pipe is fixed at such value that the critical frequency for dielectrically guided waves of the type launched from the source S falls between some harmonic, say the $n$th harmonic $f_n$, and the next lower harmonic $f_{n-1}$. Under these circumstances and at some distance away from the source S only the $n$th harmonic and higher harmonics appear, for all lower harmonics and the fundamental are suppressed by the high pass filter-like properties of the metallic pipe guide.

The electromagnetic field associated with the oscillations of fundamental frequency and the harmonics below $f_n$ may be detected in the immediate vicinity of the oscillation generator, but because of the electrical properties of the guide there is no corresponding flow of power through the interior of the pipe. If the metallic pipe is of copper or other good conducting material there is also little loss of power in the wall of the pipe surrounding the oscillation generator. Accordingly, while there may be intense oscillations at the fundamental and lower harmonic frequencies there will be little abstraction of power from the oscillation generator at these frequencies, and a much greater proportion of the power supplied to the oscillator will appear in the form of harmonic frequency oscillations having frequencies $f_n$ and higher.

If the source S is arranged to launch waves of the $H_{11}$ type, for example, then the expression for the critical relation existing at cut-off is:

$$D = \lambda / 1.706 \sqrt{K} \quad (1)$$

where D is the internal diameter of the pipe in centimeters, $\lambda$ the free space wave-length corresponding to the cut-off frequency, and K the dielectric constant of the dielectric medium filling the pipe, K being substantially unity where the medium is gaseous. The critical relation may be expressed also in the form $$f_c = c / 1.706 \, D \sqrt{K} \quad (2)$$

where $f_c$ is the cut-off frequency and $c$ is the velocity of light in free space, $3 \times 10^{10}$ centimeters per second. Supposing for specific example that the diameter D is 7.5 centimeters, that the frequency of the fundamental oscillation is 1000 megacycles per second and that the dielectric medium is gaseous, the critical frequency is $$f_c = 3 \times 10^{10} / 1.706 \times 7.5 \times 1 = 2344 \text{ megacycles/sec.}$$

The critical frequency in this case, therefore, lies between the second and third harmonics of the fundamental, these being 2000 and 3000 megacycles/sec., respectively, so that the fundamental and second harmonic are suppressed and only the third and higher harmonics are transmitted.

Figure 2:
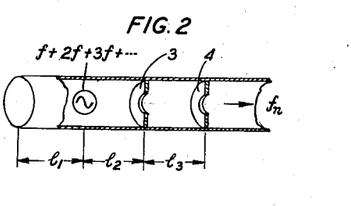

To select from the $n$th and higher harmonics some particular desired harmonic, there may be inserted in the guide a reactance spaced a critical distance from the source S, the latter also being spaced a critical distance from the closed end of the pipe. Fig. 2 shows a suitable arrangement in which the reactance takes the form of an apertured diaphragm 3, the diaphragm being spaced a distance $l_2$ from the source, and the source a distance $l_1$ from the end of the pipe. With the proper spacing of these elements and with the proper size of aperture only the $n$th harmonic will be transmitted beyond the diaphragm 3. Moreover, this combination constitutes a transformer which transforms the impedance of the guide to the value required for maximum transfer of power at the $n$th harmonic frequency from the source to the guide. Because the velocity of propagation varies with frequency, it is unlikely that an adjustment which is optimum for the selection of the $n$th harmonic will also permit one or more other harmonic frequencies to be transmitted. If such other harmonics appear, or in any case, another apertured diaphragm 4 spaced a distance $l_3$ from diaphragm 3 may be provided to form a band-pass filter so that all harmonics other than the $n$th are eliminated. Preferably the system is so proportioned that the desired harmonic corresponds to $f_n$, that is, so that the harmonic to be isolated is the one lying next above the cut-off frequency.

Figures 3, 4:
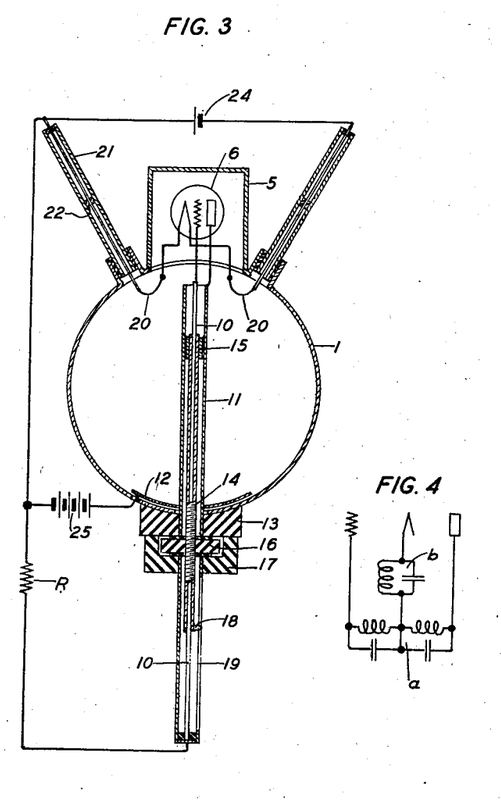
Fig. 3 shows a preferred form of oscillator in accordance with the invention.
Fig. 4 is an equivalent circuit diagram applicable to Fig. 3.

In accordance with a preferred embodiment of the invention especially adapted for the launching of guided waves of the $H_{11}$ type, the source S takes the form shown in Fig. 3. In this embodiment, oscillations of fundamental frequency $f$ are caused to flow within a shielded circuit comprising a short-circuited coaxial conductor line which greatly aids in preventing the loss of power by radiation at the fundamental frequency. Means are provided for obtaining optimum circuit impedance relations for the fundamental oscillations, while favorable impedance relations for the desired harmonic frequency are obtained by other means.

Figure 5:
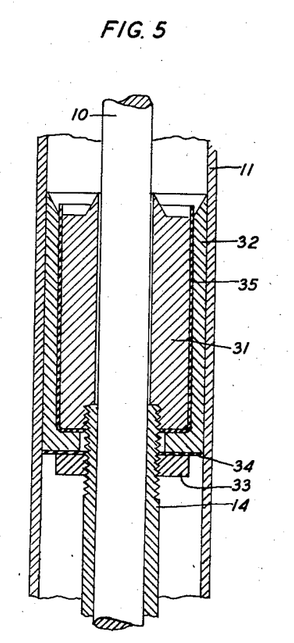
Fig. 5 shows a detail of Fig. 3.

Referring to Fig. 3, a three-element discharge device 6, comprising filamentary cathode, grid and anode, is disposed in a metallic turret 5 over an opening in the wall of pipe 1 where it is out of the path of waves within the pipe. Diametrally across the pipe from the discharge device extends a coaxial conductor pair comprising an inner conductor 10 and a tubular outer conductor 11 which respectively are connected at one end to the grid and anode of the discharge device. Short-circuiting the coaxial pair for high-frequency currents is a bridge 15 which is adjustable lengthwise within the coaxial pair to alter the effective length of line tied to the grid and anode. The bridge is shown in Fig. 5 and it will later be described in detail.

Where the outer conductor 11 of the coaxial pair passes through the pipe wall it is insulated therefrom but capacitively connected thereto by means of a metallic plate 12, and it is held in position by a block 13 of insulating material attached to the outer face of the pipe 1. Over the inner conductor 10 is coaxially disposed a hollow rod 14 the upper end of which is attached to the bridge 15 to control the position thereof. For precise adjustment of the bridge, the rod 14 is externally threaded and an adjusting nut 16 of insulating material is mounted on the threaded portion, the nut being exposed for hand operation and restrained from longitudinal movement by the block 13 on the one side and a bridge 17 of insulating material attached thereto on the other. The lower end of rod 14 carries a vane 18 which rides in a longitudinal slot in a tubular guide 19, thereby preventing rotation of the rod and serving as an indicator of the position of the short-circuiting bridge.

The filament leads 20 from the discharge device are brought out through openings in the pipe wall near the turret, and around each is a metallic tube 21 which extends outwardly from the pipe and forms with the enclosed filament lead a coaxial conductor pair. An insulating bushing is provided where each tube 21 is attached to the pipe. Each of these coaxial pairs is provided with a bridge 22 which is adapted to operate as a high-frequency capacitive short-circuiting means and which is longitudinally adjustable by means not illustrated.

Appropriate operating potentials may be applied to the elements of the discharge device in any suitable manner. In the embodiment illustrated, filament heating current is supplied from a battery 24 connected between the leads 20. A battery 25 connected between one of the filament leads and the metallic plate 12 provides anode potential, and a grid circuit resistor R connected between the lower extremity of the rod 10 and the filament permits self-biasing of the grid Unduly large values of resistance R are to be avoided inasmuch as a low-frequency oscillation may otherwise be found to be superposed on the high-frequency oscillations at lower anode voltages.

Turning attention now to the high-frequency circuits, the oscillation system illustrated in Fig. 3 may be better understood by considering the analogy it bears to the form of tuned-plate, tuned-grid oscillator represented schematically in Fig. 4. In the latter there is a frequency determining circuit $a$ connected between grid and anode. In Fig. 3 the portion of the coaxial line above the short-circuiting bridge 15 is analogous, for it also is connected between grid and anode and its length substantially fixes the fundamental frequency of oscillation. In Fig. 4 there is a branch between the cathode and the mid-point of the tuned circuit $a$; a corresponding branch may be found in Fig. 3. Thus, the bridge 15 marks the mid-point of the circuit $a$, and a high-frequency path may be traced from that point along the outer surface of conductor 11 to plate 12, thence around the inner surface of the pipe 1, out along the inner surface of each of the conductors 21, across bridges 22, and back along the filament leads 20 to the cathode. Circuit $b$ in Fig. 4 represents the impedance in the branch just traced, and by means of the filament circuit bridges 22 it may be adjusted over a wide range. These bridges may be so adjusted, in fact, that the impedance is substantially zero at the fundamental frequency of oscillation.

With the filament circuit coaxial units adjusted as last described, oscillations of great amplitude are set up, the amplitude being limited by the emissivity of the filament and by the power lost from the system in the form of heat. By keeping to a minimum the amount of insulating material in the high-frequency fields and by using conductors of low resistivity the heat losses are kept to a small value, and the amplitude of oscillations is limited primarily by the rate at which electrons can be emitted from the filament. It is characteristic of oscillations thus limited that there is a large proportion of harmonic power in the anode circuit, which it will be understood is important with regard to the objects of the present invention.

In the Lecher frame comprising the coaxial conductors 10, 11 in Fig. 3, the velocity of wave propagation is substantially independent of frequency, thus differing from the phase velocity characteristic of the dielectric guide. It follows that when the Lecher frame is tuned to a fundamental frequency $f$, it is resonant also at the harmonic frequencies, $2f$, $3f$, etc., and serves the very important function of reinforcing oscillations at these frequencies. Accordingly, the Lecher frame in Fig. 3 serves not only to fix the fundamental frequency of oscillation but also to increase the power output at the desired harmonic frequency or frequencies.

The harmonic currents in the system shown in Fig. 3 must flow along the diametral conductor 11 where they can give rise to corresponding dielectrically guided waves of $H_{11}$ type in the pipe 1, or at least to waves corresponding to such of the harmonics as lie above the cut-off frequency of the guide. The harmonic current path may not be of optimum impedance for the desired harmonic, but a favorable virtual impedance can be realized by proper adjustment of the distance $h$ indicated in Fig. 2. Ready adjustability is possible if the cap closing the end of the pipe be replaced by a longitudinally adjustable metallic piston.

In one specific embodiment in accordance with Fig. 3 where the guide 1 comprised a brass pipe having an internal diameter of 4⅞ inches, free space wave-lengths ranging continuously from 20.7 centimeters to 14.1 centimeters were obtained with substantial amounts of power over the entire range. In this range the wave observed is the second harmonic of a fundamental oscillation ranging in wave-length from 41.4 centimeters to 28.34 centimeters, and inasmuch as the latter wave-length range is above the cut-off wave-length for the particular pipe used, the field associated with the fundamental oscillation is confined to the immediate vicinity of the oscillator. Under these circumstances, the amplitude of the second harmonic is much greater than it is when the oscillator is operated in a pipe of diameter large enough to support the fundamental.

Preferably, as noted hereinbefore, the oscillation generator is disposed in a section of pipe the diameter of which is too small to support the fundamental oscillation or any harmonic oscillation up to the desired harmonic.

Fig. 5 shows a preferred form of the short-circuiting piston 15 of Fig. 3. The bridge comprises a cylindrical metallic collar 31 which slides on central conductor 10 and which is internally threaded at its lower end to receive the threaded end of hollow rod 14. Surrounding member 31 is a metallic cup 32 which is of substantially the same external diameter as the internal diameter of conductor 11. Mica 35 or other suitable insulating material separates members 31 and 32 so that a conductive short circuit of the coaxial line is avoided. A metallic nut 33 on the threaded portion of rod 12 clamps the apertured bottom of cup 32 and is insulated from the latter by mica or other suitable material 34. The upper ends of members 31 and 32 are tapered and slotted so that good contact can be had between member 31 and central conductor 10 and between member 32 and outer conductor 11.

Figure 6:
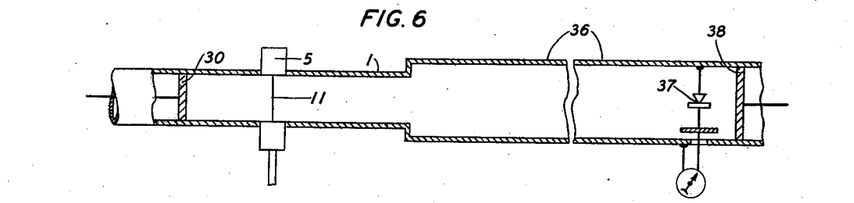
Fig. 6 illustrates a transmission system utilizing the present invention.

Fig. 6 illustrates a transmission system incorporating the oscillation generator of Fig. 3 as adapted for operation at a harmonic frequency higher than the second. Here the oscillator is interposed in a pipe 1 which is terminated at the left in an adjustable piston 30, the internal diameter of the pipe 1 being, for example, 2⅜ inches, so that the fourth harmonic of the fundamental oscillation is the lowest frequency that can be transmitted. The length of pipe 1 is sufficient to insure complete attenuation of lower order harmonics. The guide may then be expanded to any convenient diameter and a pipe 36 employed for the distance transmission of the waves. At the receiving end of the system a rectifying device 37 disposed in the path of the waves and backed by piston 38 may be used for efficient reception of the fourth harmonic transmitted. The harmonic wave may be modulated with telephone, telegraph or television signals occupying a wide range of frequencies.

Whereas in Fig. 6 a shoulder is provided at the junction of guide sections 1 and 36, this is a convenient point to introduce means for changing the type of wave from the $H_{11}$ type launched from the oscillation system to a different type which, for one reason or another may be preferred for distance transmission through the main guide 36. Figs. 7 to 14E illustrate a few kinds of wave type converters appropriate for this purpose. Although these converters are disclosed as means for changing from an $H_{11}$ wave to another type of wave, they are bilaterally operative and may be applied generally for operation in the opposite direction of transmission so as to convert the waves of incident type to waves of $H_{11}$ type.

Figure 7:
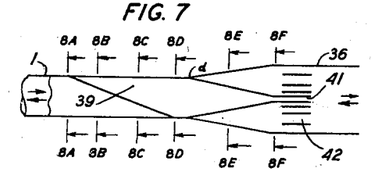
Figure 8A:
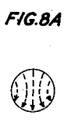
Figures 8B, 8C:
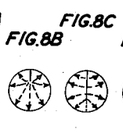
Figures 8D, 8E:
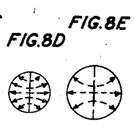
Figure 8F:
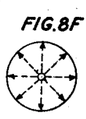
Figure 9:
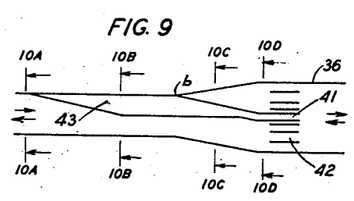
Figure 10A:
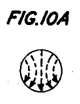
Figure 10B:
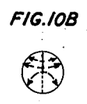
Figure 10C:
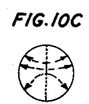
Figure 10D:
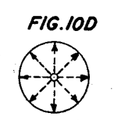
Figure 11:
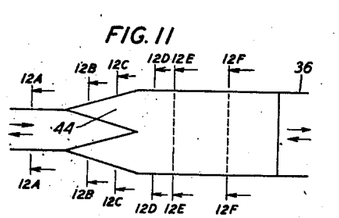

The converter shown in longitudinal section in Fig. 7 and in successive cross-sections in Figs. 8A to 8F is adapted for operation in the system illustrated in Fig. 6 to convert the incident $H_{11}$ waves to $E_{01}$ waves. A tapered pipe section is interposed between pipes 1 and 36, and a diametral metallic septum 39 is provided as shown, the septum being aligned with the electric field of the applied $H_{11}$ wave. Between points A and D the septum expands from a point on the periphery of pipe 1 to the full diameter of the pipe, then continues with the same width to $d$ where the tapered pipe section begins. The septum is then gradually and symmetrically reduced in width and ends in an axial rod 41. The principle of operation of the converter may be understood by referring to the cross-sectional views comprising Figs. 8A to 8F, and bearing in mind that lines of electric force, represented by the dotted lines, tend to meet any conducting surface perpendicularly. In effect, the incident $H_{11}$ wave is progressively distorted by the septum so that at point D two oppositely phased $H_{11}$ waves are made to appear. Between points $d$ and F these in turn are modified by the septum and merged into an $E_{01}$ wave. Preferably, the lengths of the two tapering portions of the septum are large compared with the operating wave-length. Optionally, an appropriate grating 42 may be provided around rod 41 to insure that only waves of $E_{01}$ type are delivered to guide 36. The diameter of guide 36 must of course be greater than the critical diameter for $E_{01}$ waves.

Figs. 9 and 10A to 10D show another form of $$H_{11} \rightleftarrows E_{01}$$

converter that has the advantage over the converter last described in that a lesser degree of precision in locating the septum is permissible. In this case the diametral septum 43 is tapered from a point on the periphery of the pipe at A to a width equal to the radius of the pipe at B, and it is maintained at this width to point $b$ from which it is tapered down to an axial rod 41. Figs. 10A to 10D show how the wave is progressively modified by the septum.

Figure 12A:
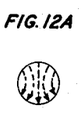
Figure 12B:
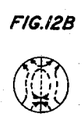
Figure 12C:
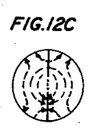
Figure 12D:
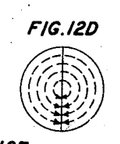
Figure 12E:
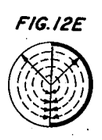
Figure 12F:
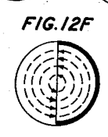
Figure 13:
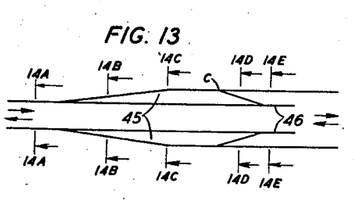
Figure 14A:
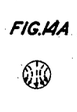
Figure 14B:
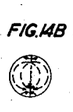
Figure 14C:
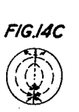
Figure 14D:
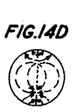
Figure 14E:
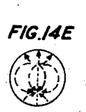

Figs. 11 and 12A to 12F show a converter for changing an $H_{11}$ wave to an $H_{01}$ wave. Here the incident $H_{11}$ wave is first modified by the bifurcated portion of septum 44 to establish at point D two oppositely phased $H_{01}$ waves in respective semi-cylindrical guide portions. The internal radius of one of these guide portions is then reduced as indicated in Fig. 12E so as to change the velocity of propagation of the wave within that portion. The portion of reduced radius extends to the end of the septum and it is made of such length that a relative phase reversal of the waves in the two semi-cylindrical portions is obtained, whereby the two coalesce to form a single $H_{01}$ wave in the guide 36.

The converter shown in Figs. 13 and 14A to 14E is adapted for interconversion of $H_{11}$ waves and $E_{11}$ waves. In this embodiment a pair of diametrally aligned septa 45 are provided which are progressively increased and decreased in width in the manner illustrated and terminated in a pair of longitudinal rods 46. The cross-sectional views comprising Figs. 14A to 14E show the progressive changes in the electric field of the waves.

Other examples of practice in accordance with the invention are shown in Figs. 15 to 18, where the discharge device is one in which grid and anode terminals are brought out on both sides of the enclosing glass envelope.

Figure 15:
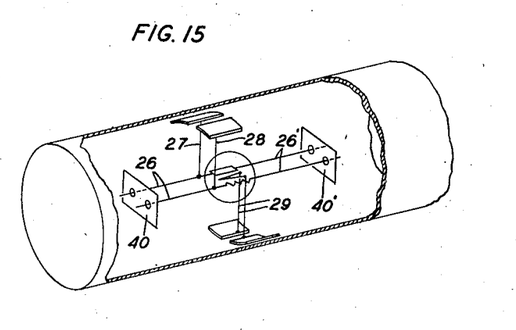
Figs. 15, 16 and 18 illustrate other forms of oscillators in accordance with the invention.

In the embodiment illustrated in Fig. 15 the discharge device is disposed near the axis of the pipe, and to one set of grid and anode terminals there is connected a pair of conductors 26 which extend away from the device parallel to the axis of the pipe. The conductor pair is capacitively short-circuited near its distant end by an adjustable bridge 40, which is shown schematically. To the other set of electrode terminals is connected a similar conductor pair 26' which extends in the opposite direction and which also is provided with an adjustable bridge 40'. At right angles to the plane of the Lecher system thus formed lie anode and grid leads 27 and 28, respectively, which are terminated, for high-frequency currents, at the pipe wall by respective condenser plates. Filament leads 29 extend in the opposite direction to individual condenser plates. Operating potentials can be supplied to the electrodes by connections extending through openings in the pipe wall to the several plates.

Figure 16:
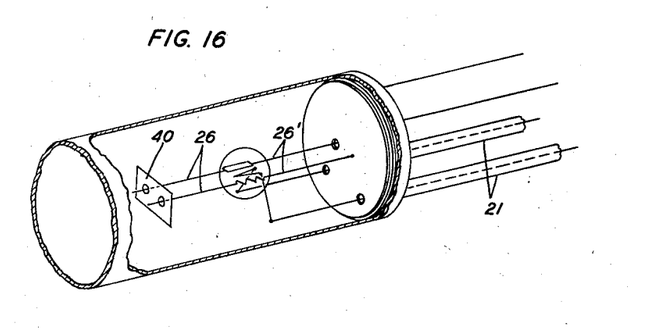
Figure 17:
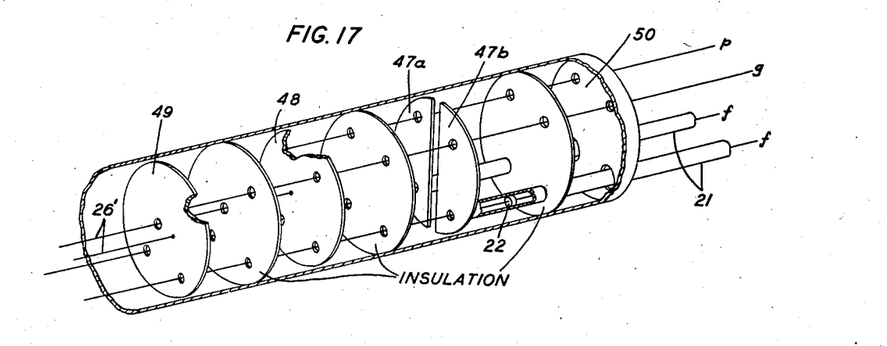
Fig. 17 is an exploded view of a detail of Fig. 16.

In Fig. 16, a conductor pair 26 and adjustable bridge 40 are provided as in Fig. 15, and also a corresponding conductor pair 26'. In lieu of bridge 40', however, provision is made in the end assemblage of the guide as shown in exploded form in Fig. 17. This assemblage comprises a metallic end cap 50 and three thin metallic discs stacked against the inner face of cap 50 with discs of mica or other suitable insulating materials separating them. To the innermost metallic disc 49 is attached the member of conductor pair 26' that is connected to the grid. To the next disc 48, and passing through an opening in the first one, is connected the other or anode member pair 26'. The third disc is divided vertically into two semicircular portions 47a and 47b, and from each portion there extends through the end cap 50 a tubular conductor which, together with a respective longitudinal lead $f$ from the filament comprises a coaxial conductor line 21. A capacitive short-circuiting bridge 22 in each coaxial line permits of filament circuit tuning as in Fig. 3. Leads $p$ and $g$ are brought out longitudinally from discs 48 and 49, respectively, through openings in the intervening discs and end cap, for connection to the external circuit elements.

Figures 18, 21:
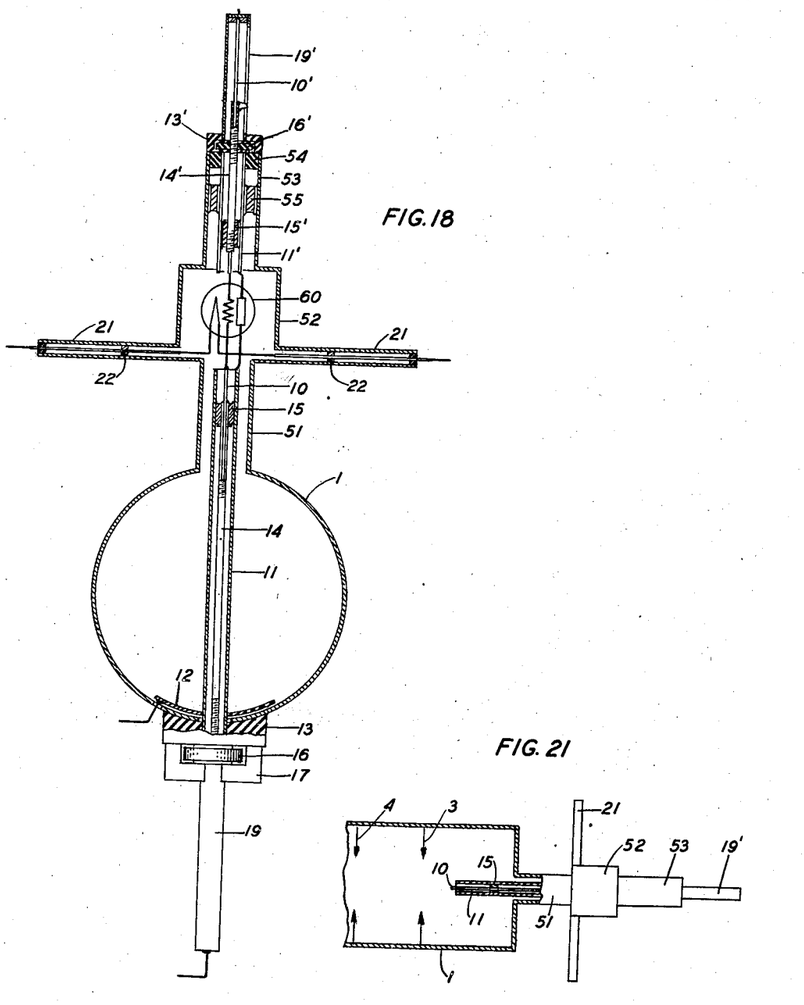
Figs. 21 to 25 show alternative embodiments of the invention.

The preferred arrangement where $H_{11}$ waves are to be generated in the pipe guide and the discharge device is of the double-ended type described with reference to Figs. 15 and 16, is illustrated in Fig. 18. It embodies several of the constructional features and advantages of the arrangement shown in Fig. 3, but as contrasted with the latter the discharge device 60 is farther from the guide 1, the metallic chamber 52 enclosing the device being connected with the interior of the pipe 1 through a tubular metallic neck 51. Through the latter and diametrally across the wave guide extends the coaxial conductor tuning and wave launching structure 10—11, which at its upper end is connected to the grid and anode of the discharge device and at its lower end is associated with the mechanism for adjusting the position of the capacitive short-circuiting piston 15, all as in Fig. 3. The tunable coaxial filament leads 21 are conveniently brought out radially from the base of the chamber 52, as shown, and need not be insulated therefrom if the respective pistons are of the excapacitive type such as shown in Fig. 5. The external circuits may be the same as those in Fig. 3 and similarly connected to the discharge device. The upper end of conductor 10' affords an alternative grid connection.

The Lecher frame in Fig. 18 is completed by another coaxial conductor line 10'—11' connected to the other pair of grid and anode terminals of the discharge device 60 and adjustably short-circuited by the condenser piston 15'. The means provided for adjusting the position of piston 15' is substantially the same as that provided for piston 15 in the other portion of the Lecher system and the primed reference characters will serve to identify corresponding elements. Another tunable coaxial conductor system is formed by conductor 11' and metallic pipe 53 which extends upward from chamber 52 to bridge 13' and encloses the upper portion of the Lecher frame. This coaxial system is short-circuited by a condenser piston 55 which may be of the type shown in Fig. 5. Means for adjusting the position of piston 55 are not illustrated, but any suitable mechanical arrangement can be employed for the purpose. For example, the piston may be provided with ears or lugs which ride in longitudinal slots in pipe 53 and external plates arranged to cover the exposed portions of the slots.

The adjustment and operation of the combination shown in Fig. 18 is as follows. The wave-length of the fundamental oscillation is fixed primarily by the distance between short-circuiting pistons 15 and 15'; experiment has shown that this distance is materially less than one-half of the fundamental wave-length. The construction of the device of Fig. 18 is such that with a given interval between pistons 15 and 15' the elements of discharge device 60 can be effectively moved a short distance to one side or the other from the mid-point of this interval. Experience has shown that ordinarily the best output is secured when the elements are near the middle of the interval, although the exact adjustments required vary from tube to tube. These adjustments having been made, adjustment of the filament tuning pistons further enhances the oscillation.

Now it has been pointed out in connection with Fig. 3 that since no fundamental frequency power is derived from the oscillation circuit except that resulting from ohmic and dielectric loss, the fundamental oscillation builds up to high amplitudes, and the oscillating current contains a substantial amount of harmonics. Harmonic power can be abstracted, because guide 1 is of such diameter as to support a wave of harmonic frequency. An instructive way to look at what transpires is to consider that the part of coaxial 11 contained within guide 1 represents an impedance connected to the source 60, an impedance possessing a resistive component by virtue of the energy flowing from it down guide 1 and a reactance by virtue of the presence of the reflecting piston 30, (shown in Fig. 6), in guide 1. Each of these components may be varied, although not independently, by varying the position of the reflecting piston 30. Also shunted on the source 60 is the outer coaxial 11'—53 with adjustable piston 55. This supplies an independently adjustable reactance element in shunt with source 60. Then the source having been adjusted for maximum intensity of oscillation at the fundamental frequency as described heretofore, maximum output at a desired harmonic requires first, adjustment of the piston 30 in guide 1 to secure a match between the resistance component of the impedance of coaxial 11 and the internal resistance of source 60, and second, adjustment of piston 55 to secure optimum reactance conditions, that is to say, approximate neutralization of the reactance of coaxial 11.

Figure 19:
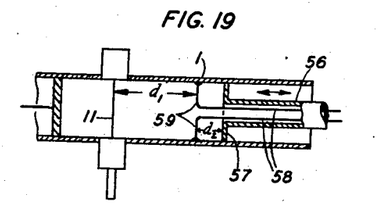
Figs. 19 and 20 show combinations in which the oscillations generated are applied to a two-wire circuit.
Figure 20:
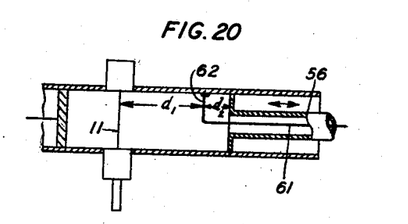

Figs. 19 and 20 illustrate how the guided waves of harmonic frequency produced by a combination such as shown in Fig. 3, for example, can be converted into ordinary conduction currents in a two-wire circuit and thus made available for general application. In Fig. 19 the cylindrical metallic shield 56 surrounding a two-wire line 58 extends axially into the oscillator pipe 1 and it is terminated with a piston-like annular flange 57 which is adapted to slide within the pipe. The conductors 58 extend beyond the flange 57 an adjustable distance $d_2$ and thence radially to opposite points on the pipe wall so that the radial portions 59 are in alignment with the electric field produced by the oscillator. The distance $d_1$ between the oscillator and the conductor portions 59 is made large enough to insure suppression of fundamental and unwanted lower harmonic frequencies by the filter-like properties of the pipe guide 1, and additional filtering means may be inserted in this portion, if desired. The distances $d_1$ and $d_2$ are then so adjusted as to produce a maximum transfer of energy into the shielded pair at the desired harmonic frequency or frequencies.

The combination shown in Fig. 20 is substantially the same in construction and operation as the one last described, except that the two-wire line comprises a coaxial conductor pair 56—61, the inner conductor 61 of which is terminated in a single radial conductor 62 aligned with the incident electric field.

For the production of harmonic waves of symmetric electric or $E_{01}$ type, the arrangement shown in Fig. 21 may be used. It is similar to the combination illustrated in Fig. 18 in that the same kind of discharge device, frequency determining means, tuning adjustments and housing may be employed and it is illustrated in Fig. 21 as comprising all of the Fig. 18 structure that lies above the junction of neck 51 and guide 1. This structure is mounted at the end of a metallic pipe guide 1 with the inner coaxial system 10—11 projecting axially into the pipe through the end cap thereof, the latter being arranged as a flange at the end of neck 51. Electrical connection to the anode may be made at the end of tubular conductor 11', and to the grid at the end of inner conductor 10'. The manner of adjustment is the same as that described with reference to Fig. 18, and the manner of operation is essentially the same except that the conductor 11 cooperates with the adjacent portions of pipe 1 and neck 51 to launch waves of symmetric electric type. Restriction of the diameter of pipe 1 permits suppression of the oscillations of fundamental frequency, and reactors 3 and 4 may be utilized to discriminate between the various harmonics that appear as described hereinbefore.

Figures 22, 23:
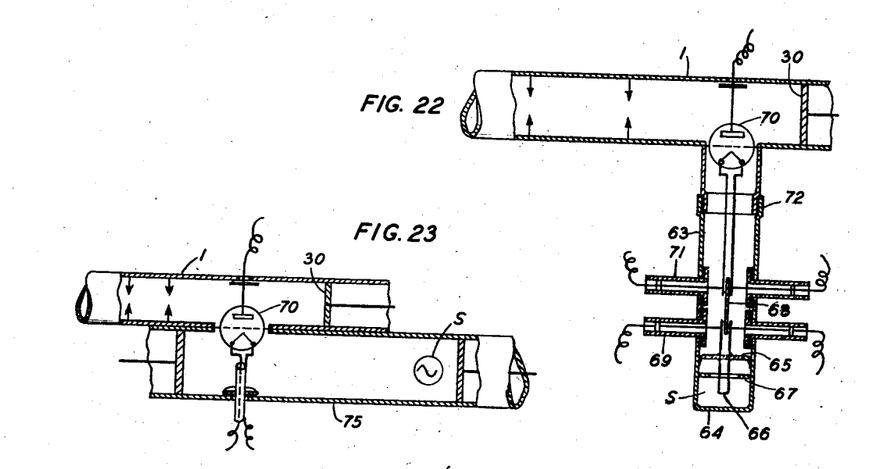

In the examples hereinbefore presented the source of harmonic power has been a primary source, that is, one in which a continuous power input, derived from batteries, for example, is converted by some mechanism into an alternating current output having a certain fundamental frequency. Figs. 22 and 23 illustrate embodiments in which the primary source is used to drive a secondary source, viz., a harmonic generator.

In Fig. 22 the primary source is a diode oscillator S comprising an evacuated chamber formed within cylindrical metallic pipe 63 between the metallic end cap 64 thereof and glass seal 65. The filamentary cathode 66 of the diode is disposed in close proximity to the center of end cap 64, the latter constituting the anode. The frequency of oscillation is determined by the size of the cavity that is bounded at one end by cap 64 and at the other by apertured metallic diaphragm 67. The leads to filament 66 are brought substantially axially through pipe 63 and the aperture in diaphragm 67 into capacitive relation with a metallic plate 68, thence radially in opposite directions through the walls of the pipe where they are continued as the central conductors of capacitively short-circuited coaxial units 69, the outer conductors of which are insulated from pipe 63.

At its upper end, pipe 63 terminates at an opening in the wall of metallic pipe guide 1, and within the opening is disposed a three-electrode discharge device 70, the grid electrode of which extends in all directions beyond its enclosing glass envelope to cover the end of pipe 63. The anode of device 70 lies within guide 1 and the connection thereto extends diametrally across the guide and through an opening in the opposite side to a suitable source of direct current potential. This diametral lead serves to launch in the wave guide 1 waves of the $H_{11}$ type. The filamentary cathode of the device 70 lies on the other side of the grid and the connections thereto are brought axially through pipe 63 into capacitance relation with plate 68, thence radially through laterally extending coaxial units 71. Pipe 63 is conductively broken at the overlapping joint 72. Coaxial units 69 and 71 may be tuned to exclude high-frequency currents from the external filament circuits.

In the operation of the combination shown in Fig. 22 oscillations of fundamental frequency from the diode are transmitted as coaxial conductor waves to the cathode-grid region of discharge device 70. The latter is operated with the grid biased negatively with respect to the cathode so that ordinarily little or no space current flows from the cathode to the anode. Under these circumstances the output of device 70 is rich in harmonics of the fundamental frequency applied and any desired harmonic may be selected by proper restriction of the diameter of pipe 1 and by proper adjustment of the iris diaphragms in accordance with principles hereinbefore described.

In Fig. 23 the primary source S is disposed near the closed end of a short section of metallic pipe guide 75 and the $H_{11}$ waves generated by the source are impressed at the other end of the section of guide on the cathode-grid space of the discharge device 70, the grid of which extends over an opening in the pipe wall. The main guide 1 overlaps the guide section 75 so that the grid of the discharge device lies in the common boundary, and the anode is within guide 1. Again a diametral lead from the anode assists in launching waves of the $H_{11}$ type in the main guide. The discharge device 70 is biased so that its output is rich in harmonics and the diameter of wave guide and the adjustment of the iris diaphragms is such as to select the desired harmonic. Whereas the source S is shown as a primary source it may comprise a device such as discharge device 70 disposed in a common boundary between guide section 75 and another guide section not shown and driven by a primary or harmonic source in the added section of guide. In fact, the harmonic generating stages can be concatenated in any desired degree to the end that the primary source has a frequency low enough that it may be controlled by a piezoelectric crystal or other frequency controlling means. Thus the desirable feature of great constancy in the frequency of the ultimately derived harmonic wave can be secured.

I have found that in a split-plate magnetron oscillator operated in the dynatronic mode of oscillation there is a strong double frequency current in the common lead to the split plates. One object of my invention is to provide means for accentuating this double frequency current and delivering its power to a load to the substantial exclusion of the oscillations of fundamental frequency. Another object is to increase the double frequency or second harmonic power output of an oscillator of the kind described, relative to the power output at the fundamental frequency of oscillation. In accordance with the illustrative embodiment of this phase of my invention as shown schematically in Fig. 24, where the load comprises a metallic pipe guide, the foregoing objects are realized in a combination utilizing the high-pass filter characteristic of the metallic pipe guide.

The usual split-plate magnetron comprises a pair of anodes that are spaced apart on opposite sides of a filamentary cathode and so shaped as to form a substantially cylindrical open-ended chamber coaxial with the filament. Means are provided for establishing a strong unidirectional magnetic field within and parallel to the axis of the chamber, and a Lecher frame or other tuned circuit is connected to the anodes for fixing the frequency of oscillation. In some cases the plate is split into more than two parts, but the type having two anode elements will suffice for illustration of the invention. A direct current source, which may conveniently be connected to the electrical mid-point of the tuned circuit, biases the two anodes equally and positively with respect to the cathode. Strong oscillations even at frequencies above a billion cycles per second have been obtained. The practical construction, adjustment and operation of oscillators of this kind are details well known to those skilled in the art and need no elaboration here. Reference is made in this connection to the paper by G. R. Kilgore appearing in the August 1936 issue of the Proceedings of the Institute of Radio Engineers, pages 1140–1157, and particularly to Fig. 13 thereof.

Figures 24, 25:
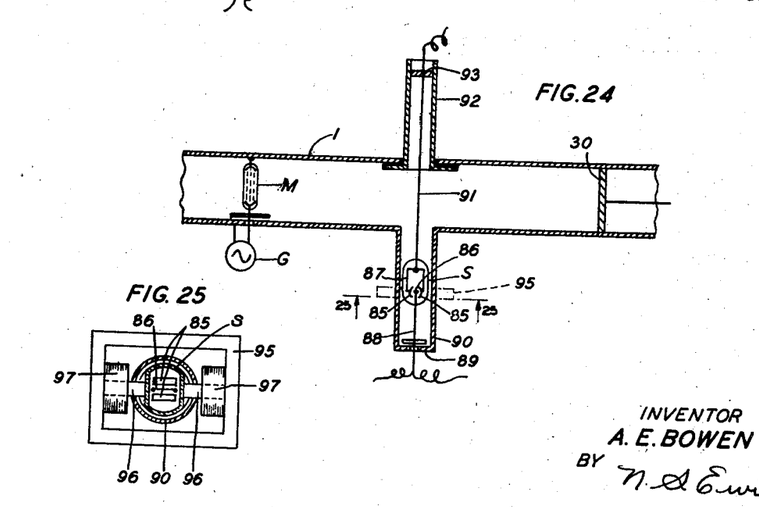

Referring now to Fig. 24 a magnetron is shown schematically as comprising two semicylindrical anodes 85 surrounding a filamentary cathode 86, and a fundamental frequency determining Lecher wire system 87, the open end of which is connected to the anodes, all enclosed within an evacuated glass vessel. This combination is disposed within a metallic pipe 90 with the wires of the Lecher system parallel to the axis thereof. The filament leads 88 are brought out together substantially axially through pipe 90 and through a central aperture in the metallic cap 89 which closes the end of the pipe, and the common lead 91 to the split plate extends axially in the other direction from the short-circuited end of the Lecher system and is connected eventually to the anode voltage source.

To obtain the required magnetic field an electromagnet may be employed as shown in Fig. 25 in which the pole-pieces 96 extend through opposite openings in the wall of pipe 90 into close proximity to the ends of the filamentary cathode 86. These pole-pieces are shown as carrying direct current windings 97, and the magnetic circuit is closed through the rectangular yoke 95. Optionally, the glass envelope may be replaced by glass seals disposed across pipe 90 on opposite sides of the magnetron.

It can be shown theoretically and I have demonstrated experimentally that a strong second harmonic electromotive force is developed between the cathode and the terminal connected to the anode voltage source, that is, the terminal at the short-circuited end of the Lecher frame, and that there is substantially no fundamental frequency component between these two points. Ordinarily this double frequency electromotive force is short-circuited by the external cathode-anode circuit and no use is made of it, power being abstracted from the oscillator substantially only at the fundamental frequency as by connecting the load across the two anodes. The arrangement shown in Fig. 24, however, enables efficient abstraction of power at the harmonic frequency and at the same time suppresses dissipation of power at the fundamental frequency. In the latter respect, it is similar to other embodiments of the invention hereinbefore described. As in these other embodiments the oscillator is completely shielded and so arranged that power can escape from its immediate vicinity substantially only in the form of dielectrically guided waves of frequencies greater than the fundamental frequency of the oscillator.

Thus in Fig. 24 the wave guide load comprises the metallic pipe 1, and the oscillator pipe 90 branches from it radially in one direction with the anode lead 91 extending diametrally through the pipe 1 so that high-frequency currents in the anode lead can give rise to dielectrically guided waves of asymmetric magnetic or $H_{11}$ type within the pipe 1. Branching radially in the opposite direction is a pipe 92, conductively insulated from guide 1, and through it conductor 91 is carried axially to form a coaxial conductor line capacitively short-circuited by an adjustable piston 93. Guide 1 is terminated in a movable reflecting piston 30 which is to be adjusted in position concurrently with adjustment of piston 93 until a combination is found for which the second harmonic power output to the guide 1 is a maximum. An increase in the power output may sometimes be had by shifting the magnetron longitudinally within the pipe 90. To insure against escape of power from the oscillation system at the fundamental frequency, the transverse dimensions of the guide 1 are so restricted that the transmission cut-off frequency lies between the fundamental frequency and the second harmonic frequency.

Where signals are to be impressed on the selected harmonic, it has been found that any modulation system in which the amplitude of the fundamental oscillation is modulated introduces a component of frequency modulation as well. This result is objectionable inasmuch as it is preferred that the wave be either solely amplitude modulated or solely frequency modulated. The devices described in this application are adapted to produce amplitude modulated waves if the modulation is performed on the harmonic rather than on the fundamental wave. This can be done as illustrated in Fig. 24 by interposing in the path of the selected harmonic wave in the guide 1 an attenuator, the resistance of which depends upon the voltage applied to it by the signal source G. The particular attenuating device shown comprises a neon or other gas discharge tube M so proportioned that the discharge forms a barrier or screen across the guide 1. The intensity of the discharge and consequently the modulation of the guided wave, is controlled by the modulating source G. The modulator M might be replaced by a rod or disc of some material having a non-linear resistance-voltage characteristic arranged so that the modulating source controls the resistance of the device.

Although the present invention has been described with reference to various specific embodiments it will be understood that these are primarily illustrative and that the invention includes such other embodiments as come within the spirit and scope of the appended claims.

What is claimed is:

1. In combination, a wave guide comprising a metallic pipe, an oscillation generator for launching in said guide ultra-high frequency waves of a character such that the guide presents to them the characteristic of a high-pass filter, said generator comprising a frequency controlling Lecher system tuned to the fundamental frequency of operation and to harmonics thereof, and a reflector in said guide spaced in one direction from said generator a distance that is optimum with respect to the launching of waves of harmonic frequency in the opposite direction, said distance being non-optimum for the launching of waves of said fundamental frequency.

2. In combination, a metallic pipe for the transmission of dielectrically guided waves, a metallically shielded enclosure opening into said pipe, an oscillation generator comprising a space discharge device in said enclosure, a shielded transmission line constituting a Lecher system for controlling the fundamental frequency of oscillation and enhancing harmonic oscillations, and means excited by said harmonic oscillations for establishing corresponding guided waves in said pipe.

3. A combination in accordance with claim 2 comprising circuit means for controlling the impedance of said generator to oscillations of said fundamental frequency.

4. A combination in accordance with claim 2 comprising means for controlling the impedance presented to said pipe at different frequencies.

5. A combination in accordance with claim 2 comprising a reflector in said pipe spaced in one direction from said generator a distance that is optimum for the launching of waves of harmonic frequency in said pipe.

6. In combination, a wave guide comprising a metallic pipe, a metallically shielded enclosure branching from said pipe, a space discharge device in said enclosure, said device having at least three electrodes, means adapting said device to generate ultra-high frequency oscillations comprising a short-circuited, shielded transmission line connected to two of said electrodes, and a conductor extending from the short circuit transversely of said pipe, along a path conforming with the transverse electric field of a wave adapted for dielectrically guided propagation through said pipe, into electrical connection with the third of said electrodes, the cut-off frequency of said guide being higher than the lowest frequency at which said line is resonant, and a reflector across said guide spaced a distance one way from said conductor that is substantially optimum for the reenforcement of a guided wave harmonically related to said lowest frequency.

7. A combination in accordance with claim 6 comprising tuning means in the connection between said short circuit and said third electrode for minimizing the circuit impedance at said lowest frequency.

8. In combination, a guide for high-frequency electromagnetic waves comprising a metallic pipe, an oscillator comprising a space discharge device and a Lecher system for fixing the fundamental frequency thereof, means energized by harmonic oscillations from said oscillator for launching corresponding dielectrically guided waves in said pipe, a reflector within said pipe spaced in one direction from said launching means for enhancing the transmission of waves in the other direction, and an adjustable reactor for controlling the impedance presented by said oscillator to said launching means.

9. In combination, a metallic pipe guide, a reflector across said guide, a Lecher frame disposed longitudinally within said guide and substantially coaxial therewith, said Lecher frame being short-circuited at one end by means comprising said reflector, and an oscillator comprising a space discharge device interposed in said Lecher frame, the cut-off frequency of said guide being higher than the fundamental frequency to which said Lecher frame is tuned.

10. A dynatronic oscillator comprising a split-plate magnetron having a cathode and a pair of anode segments, circuit means tuned to the fundamental frequency of said oscillator and connected across said pair of anode segments, a circuit conjugate to said tuned circuit means and connecting said pair of anode segments through a common lead to said cathode, a useful load, and means coupling said load to said common lead in oscillatory power transfer relation with harmonic currents in said common lead.

11. A combination in accordance with claim 10 in which said coupling means has frequency selective characteristics whereby it discriminates against currents of fundamental frequency.

12. A combination in accordance with claim 10 in which said connecting circuit is connected between said cathode and a nodal point of said tuned circuit means.

13. A combination in accordance with claim 10 in which said connecting circuit is connected between said cathode and a nodal point of said tuned circuit means, and in which said load and coupling means have frequency selective characteristics whereby they are receptive to currents of second harmonic frequency.

14. In combination, an oscillator comprising a split-plate magnetron adapted for oscillation in the dynatronic mode, a metallic pipe, a circuit comprising a common lead to the split plates, at least a portion of said lead comprising means within said pipe for launching waves of harmonic frequency therein, the transverse dimensions of said pipe being so related to the fundamental frequency of said oscillator that the cut-off frequency of said pipe is greater than said fundamental frequency.

15. In combination, a split-plate magnetron adapted for oscillation in the dynatronic mode, frequency determining means comprising a tuned transmission line connected to the split plate, a wave guide comprising a metallic pipe, a chamber comprising a metallic pipe branching from said guide and enclosing said magnetron and said means, another pipe branching oppositely from said guide, a common plate lead connected to the electrical mid-point of said transmission line for the conduction of second harmonic currents, said lead extending through said chamber and said other pipe, means for tuning said lead, a reflector in said guide, said tuning means and said reflector being so adjusted as to enhance waves of second harmonic frequency launched into said guide.

ARNOLD E. BOWEN.